United States Patent
Xu

(10) Patent No.: US 8,265,065 B2
(45) Date of Patent: *Sep. 11, 2012

(54) METHOD AND SYSTEM FOR VOICE-OVER-INTERNET-PROTOCOL (VOIP) TRANSMISSION IN A WIRELESS COMMUNICATIONS NETWORK

(75) Inventor: Shugong Xu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1397 days.

This patent is subject to a terminal disclaimer.

(21) Appl. No.: 11/855,919

(22) Filed: Sep. 14, 2007

(65) Prior Publication Data

US 2009/0073959 A1    Mar. 19, 2009

(51) Int. Cl.
*H04L 12/66* (2006.01)
*H04W 4/00* (2009.01)

(52) U.S. Cl. ............... 370/352; 370/328; 370/329

(58) Field of Classification Search ......... 370/352, 370/328, 329, 336, 337, 493, 528, 345, 347, 370/349, 392; 455/466

See application file for complete search history.

(56) References Cited

U.S. PATENT DOCUMENTS

| | | | |
|---|---|---|---|
| 6,282,182 B1* | 8/2001 | Pecen et al. | 370/336 |
| 2006/0067324 A1* | 3/2006 | Kim et al. | 370/395.2 |
| 2007/0053456 A1 | 3/2007 | Kim | |
| 2007/0104149 A1 | 5/2007 | Khan et al. | |
| 2007/0104150 A1 | 5/2007 | Fernandez-Corbaton et al. | |
| 2007/0115796 A1 | 5/2007 | Jeong et al. | |
| 2008/0014946 A1* | 1/2008 | Kubota | 455/436 |
| 2008/0084851 A1* | 4/2008 | Kim et al. | 370/336 |
| 2008/0186944 A1* | 8/2008 | Suzuki et al. | 370/349 |
| 2010/0278196 A1* | 11/2010 | Kapoor et al. | 370/477 |

OTHER PUBLICATIONS

3rd Generation Partnership Project; Technical Specification Group Radio Access Network; Physical Channels and Modulation (Release 8), 3GPP TS 36.211 V0.4.0 (Feb. 2007).

3rd Generation Partnership Project;Technical Specification Group Radio Access Network; Evolved Universal Terrestrial Radio Access (E-UTRA) and Evolved Universal Terrestrial Radio Access Network (E-UTRAN);Overall description; Stage 2 (Release 8) 3GPP TS 36.300 V8.1.0 (Jun. 2007).

3GPP TSG-RAN WG2 #58bis (R2-07777) Orlando, Florida, Jun. 25-29, 2007.

(Continued)

*Primary Examiner* — Asad M Nawaz
*Assistant Examiner* — Stephanie Chang
(74) *Attorney, Agent, or Firm* — Thomas R. Berthold

(57) ABSTRACT

The invention is a method and system for reliably detecting the start and/or end of silence periods during voice-over-internet-protocol (VoIP) sessions in a wireless communications network. A VoIP session typically includes "talkspurt" periods, during which VoIP packets are transmitted, and silence periods, during which silence indication (SID) packets are transmitted. Both the base station (eNodeB or eNb) and the mobile device (user equipment or UE) may inspect the packets to identify them as VoIP or SID packets. Alternatively, only the eNB inspects the packets. The eNB then flags the first SID packet after a VoIP packet as the start of a silence period, and flags the first VoIP packet after a SID packet as the end of a silence period. The eNB then modifies the header of the medium access control (MAC) protocol data unit (PDU) prior to transmission to the UE. The UE then detects the modified MAC headers to identify the start and/or end of silence periods.

4 Claims, 5 Drawing Sheets

OTHER PUBLICATIONS

3GPP TSG-RAN WG2 #58bis (R2-072599) Orlando, Florida, Jun. 25-29, 2007.
3GPP TSG RAN1 Meeting #49 (R1-072639) Kobe, Japan, May 7th-11th, 2007.
3GPP TSG-RAN WG2 Meeting #57bis (R2-071535) St. Julian's, Malta, Mar. 26-30, 2007.
3GPP TSG-RAN WG2 #55 (R2-062788) Seoul, Korea, Oct. 9-13, 2006.
3GPP TSG-RAN WG2 #58 (R2-071818) Kobe, Japan, May 7-11, 2007.
3GPP TSG-RAN WG2 #57 (R2-071368) Malta, Mar. 2007.
3GPP TSG-RAN WG2 #59 (R2-073582) Athens, Greece, Aug. 20-24, 2007.

* cited by examiner

… (continued)

METHOD AND SYSTEM FOR VOICE-OVER-INTERNET-PROTOCOL (VOIP) TRANSMISSION IN A WIRELESS COMMUNICATIONS NETWORK

RELATED APPLICATIONS

This application is related to application Ser. No. 11/837,952, filed Aug. 13, 2007, now U.S. Pat. No. 7,899,003 B2, titled "METHOD AND SYSTEM FOR CONTROL OF DISCONTINUOUS RECEPTION (DRX) BY A MOBILE DEVICE IN A WIRELESS COMMUNICATIONS NETWORK SUPPORTING VOICE-OVER-INTERNET-PROTOCOL (VoIP)", and assigned to the same assignee as this application.

This application is also related to application Ser. No. 11/855,902, now U.S. Pat. No. 8,059,632 B2, filed concurrently with this application, titled "METHOD AND SYSTEM FOR TRANSMISSION OF CHANNEL QUALITY INDICATORS (CQIs) BY MOBILE DEVICES IN A WIRELESS COMMUNICATIONS NETWORK", and assigned to the same assignee as this application.

BACKGROUND OF THE INVENTION

1. Field of the Invention

The invention relates generally to a wireless communications network, like a cellular network, and more particularly to a method and system for voice-over-internet-protocol (VoIP) transmission in the network.

2. Description of the Related Art

A cellular network is a wireless communications system made up of a number of cells, each served by a fixed transmitter, known as a cell site or base station. Each cell site in the network typically overlaps other cell sites. The most common form of cellular network is a mobile phone (cell phone) system. The base stations are connected to cellular telephone exchanges or "switches", which in turn connect to the public telephone network or another switch of the cellular company.

The 3$^{rd}$ Generation Partnership Project (3GPP) is a worldwide consortium to create a specification for a globally applicable third generation (3G) mobile phone system. 3GPP's plans are currently in development under the title Long Term Evolution (LTE). The 3GPP LTE project is to improve the Universal Mobile Telecommunications System (UMTS) terrestrial radio access mobile phone standard to cope with future requirements. Goals of 3GPP LTE include improving efficiency, lowering costs, improving services, making use of new spectrum opportunities, and better integration with other open standards. The 3GPP LTE technical specification is described in a set of reference documents including *3$^{rd}$ Generation Partnership Project; Technical Specification Group Radio Access Network; Physical Channels and Modulation (Release 8)*, 3GPP TS 36.211 V0.4.0 (2007-02); and *3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)*, 3GPP TS 36.300 V8.1.0 (2007-06). In 3GPP LTE (E-UTRA and E-UTRAN) terminology, a base station is called an "eNode-B" (eNB) and a mobile terminal or device is called a "user equipment" (UE).

The data transmitted over the wireless network is often categorized as either non-real-time (NRT) data or real-time (RT) data. Examples of NRT data include data transmitted during web browsing by a UE or text-messaging to a UE, while an example of RT data is voice communication between UEs. In 3GPP LTE, voice communication (RT data) is considered the most important application and will be carried as voice-over-internet-protocol (VoIP) transmissions.

A typical VoIP session has periodic small VoIP data packets at fixed intervals and periodic silence indication (SID) packets at fixed intervals. There are thus two distinct periods in VoIP transmission: talkspurt periods during which VoIP packets are transmitted, and silence periods during which SID packets are transmitted. There are certain aspects or features of VoIP that can be improved with knowledge of the transitions between talkspurt periods and silence periods.

What is needed is a method and system for reliably detecting the transition between a talkspurt period and a silence period (i.e., the start of a silence period) and/or the transition between a silence period and a talkspurt period (i.e., the end of a silence period) during VoIP sessions.

SUMMARY OF THE INVENTION

The invention relates to a method and system for reliably detecting the start and/or end of silence periods during voice-over-internet-protocol (VoIP) sessions in a wireless communications network. The network includes at least one base station (eNodeB or eNB) and at least one mobile device (user equipment or UE). A VoIP transmission typically includes "talkspurt" periods, during which VoIP packets are transmitted, and silence periods, which start with a silence indication (SID) packet and continue with periodic SID packets until a VoIP packet is received. In one technique for detecting the start and/or end of a silence period, both the eNb and the UE inspect the payloads of the VoIP packets and SID packets to identify each packet as either a VoIP packet or a SID packet. The first SID packet that occurs after a VoIP packet can thus be identified as the start of a silence period. Similarly, the first VoIP packet that occurs after a SID packet can thus be identified as the end of a silence period. In another technique only the eNB inspects the payloads of the VoIP packets and SID packets. The eNB then flags the first SID packet after a VoIP packet as the start of a silence period, and flags the first VoIP packet after a SID packet as the end of a silence period. The eNB then modifies the header of the medium access control (MAC) protocol data unit (PDU) prior to transmission to the UE. The UE then detects the modified MAC header to identify the start and end of silence periods. As an alternative to inspecting the IP payloads to identify packets as VoIP packets or SID packets, the IP packets can be inspected or checked for size to identify them as VoIP packets or SID packets, since it is known that a SID packet is smaller than the smallest possible VoIP packet.

For a fuller understanding of the nature and advantages of the present invention, reference should be made to the following detailed description taken together with the accompanying figures.

and uplink (UL) silence periods, UL and DL acknowledgement/negative acknowledgement (ACK/NAK) signals, and UL channel quality indictor (CQI) transmissions.

Figure 5:
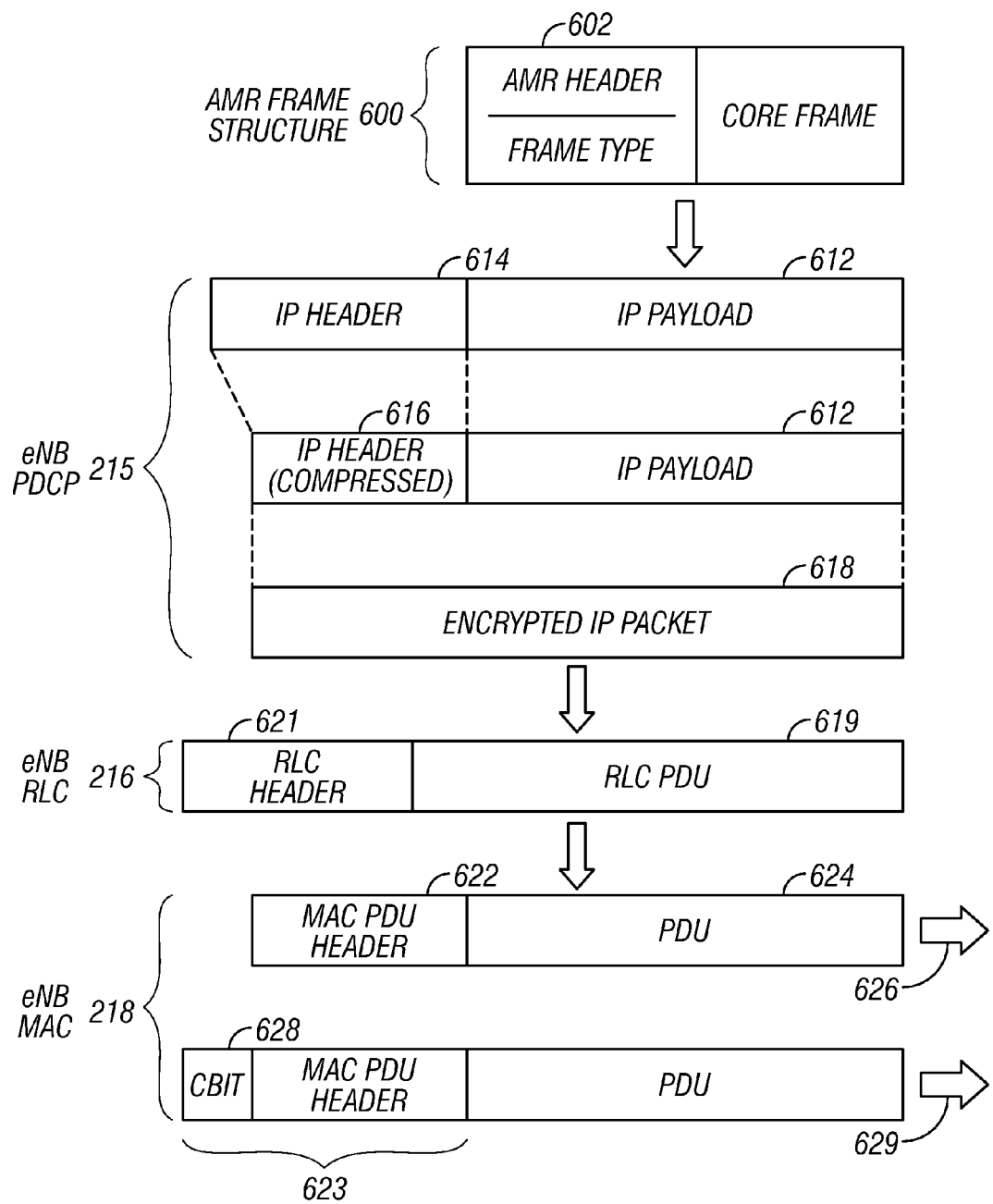

FIG. 5 is a diagram illustrating a method for identifying the start and/or end of a silence period.

DETAILED DESCRIPTION OF THE INVENTION

Figure 1:
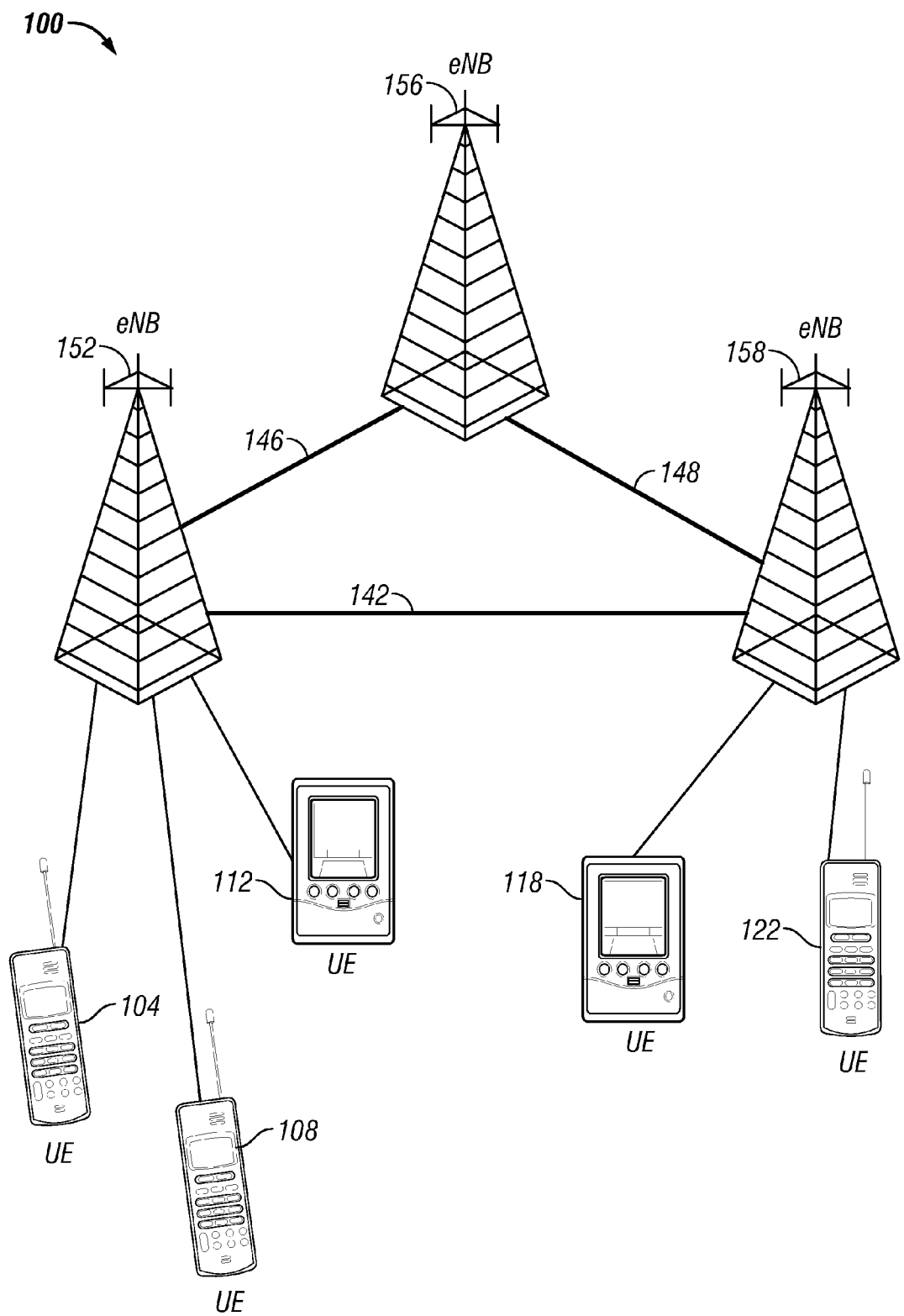
FIG. 1 is a diagram of a wireless communication system like that proposed by 3GPP LTE E-UTRAN and shows three eNodeBs (base stations) and five items of user equipment (UEs) (mobile devices).

FIG. 1 is a diagram of a wireless communication system 100 like that proposed by 3GPP LTE E-UTRAN. The system includes a plurality of eNodeBs (eNBs) (base stations) 152, 156, 158 and a plurality of UEs (mobile phones or terminals), such as mobile phones or terminals 104, 108, 112, 118 and 122, 124. The eNBs 152, 156, 158 are connected to each other via links 142, 146 and 148 and to a central gateway (not shown) that provides connection of the system to the public telephone network.

The eNBs 152, 156, 158, provide the E-UTRA user-plane and control-plane protocol terminations towards the UEs. An eNB is a unit adapted to transmit to and receive data from cells. In general, an eNB handles the actual communication across the radio interface, covering a specific geographical area, also referred to as a cell. Depending on sectoring, one or more cells may be served by one eNB, and accordingly one eNB may support one or more mobile devices (UEs) depending on where the UEs are located. Also, an eNB may have more than one physical transmit antenna port. An eNB may use multiple physical antenna ports to create "virtual" antenna ports. Thus, an antenna port may be a physical antenna port or a virtual antenna port. In 3GPP LTE E-UTRAN, four antenna ports are supported.

The eNBs 152, 156, 158 may perform several functions, which may include but are not limited to, radio resource management, radio bearer control, radio admission control, connection mobility control, dynamic resource allocation or scheduling, and/or scheduling and transmission of paging messages and broadcast information. In the example of FIG. 1, there are three eNBs 152, 156, 158. The first eNB 152 manages, including providing service and connections to, three UEs 104, 108, 112. Another eNB 158 manages two UEs 118, 122. Examples of UEs include mobile phones, personal digital assistants (PDAs), computers, and other devices that are adapted to communicate with the mobile communication system 100. Downlink (DL) refers to transmission from the eNB to a UE, and uplink (UL) refers to transmission from a UE to the eNB.

The eNBs 152, 156, 158 may communicate via links 142, 146, 148 with each other, via an X2 interface, as defined within 3GPP LTE. Each eNB may also communicate with a Mobile Management Entity (MME) and/or a System Architecture Evolution (SAE) Gateway, not shown. The communication between an MME/SAE Gateway and an eNB is via an S1 interface, as defined within the Evolved Packet Core specification within 3GPP LTE.

Figure 2:
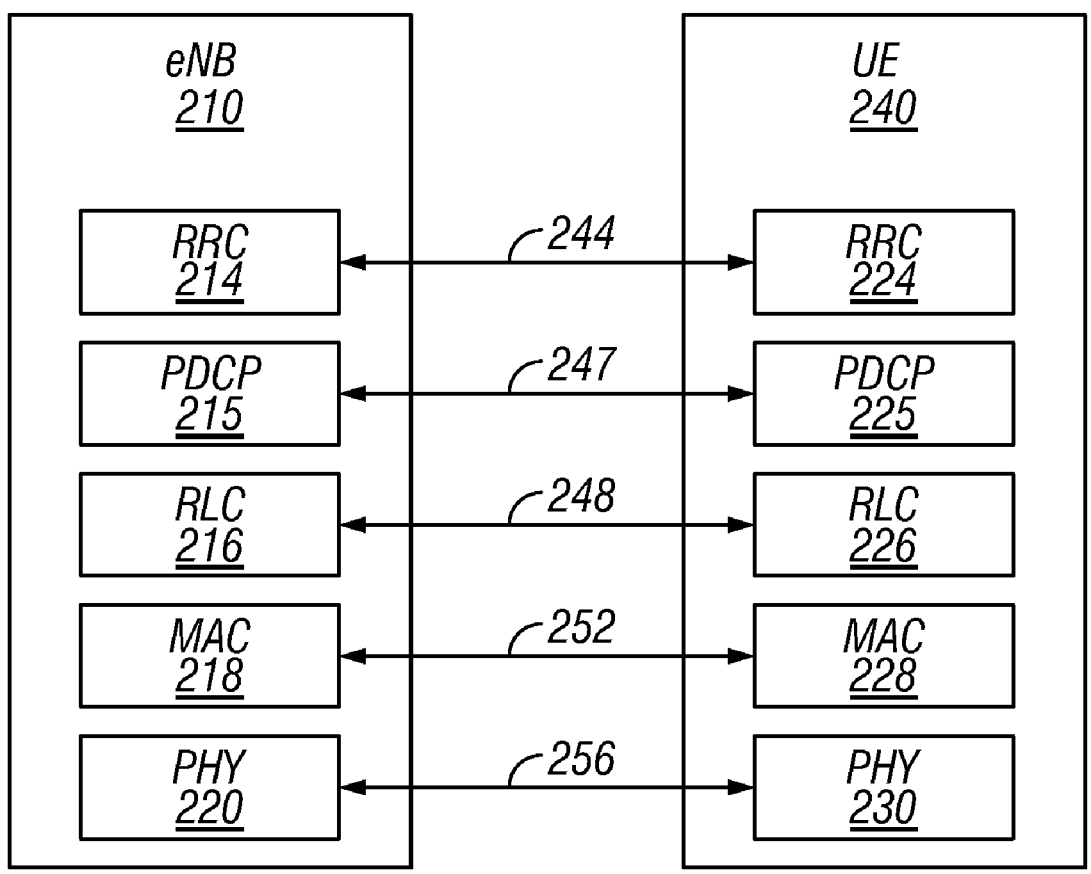
FIG. 2 is a diagram of a portion of the protocol stack for the control plane of a typical eNodeB (eNB) and a typical UE.

FIG. 2 is a diagram of a portion of the protocol stack for the control plane of a typical eNB 210 and a typical UE 240. The eNB 210 and UE 240 each typically contains a dedicated processor and/or microprocessor (not shown) and associated memory (not shown). The protocol stacks provide a radio interface architecture between an eNB 210 and a UE 240.

The control plane in general includes a Layer 1 (L1) stack comprising a physical (PHY) layer 220, 230; a Layer 2 (L2) stack comprising a medium access control (MAC) 218, 228 sublayer, a Radio Link Control (RLC) sublayer 216, 226, and a Packet Data Convergence Protocol (PDCP) sublayer 215, 225; and a Layer 3 (L3) stack comprising a Radio Resource Control (RRC) layer 214, 224. Each layer communicates with its compatible layer, as shown by 244, 247, 248, 252, and 256.

The RRC layer 214, 224 is a L3 radio interface that handles the control plane signaling of L3 between the UEs and E-UTRAN and performs functions for connection establishment and release, broadcast of system information, radio bearer establishment/reconfiguration and releases, RRC connection mobility procedures, paging notification and release, and outer loop power control. The PDCP L2 sublayer 215, 225 performs header compression and decompression, and ciphering (encryption). The RLC L2 sublayer 216, 226 provides transparent, unacknowledged, and acknowledged data transfer service. The MAC L2 sublayer 218, 228 provides unacknowledged data transfer service on the logical channels and access to transport channels. The MAC sublayer 218, 228 is also typically adapted to provide mappings between logical channels and transport channels.

The PHY layer 220, 230 provides information transfer services to MAC 218, 228 and other higher layers 216, 214, 226, 224. Typically the PHY layer transport services are described by their manner of transport. Furthermore, the PHY layer 220, 230 is typically adapted to provide multiple control channels. The UE 240 is adapted to monitor this set of control channels. Furthermore, as shown, each layer communicates with its compatible layer 244, 248, 252, 256. The specifications and functions of each layer are described in detail in the 3GPP LTE specification documents.

Figure 3:
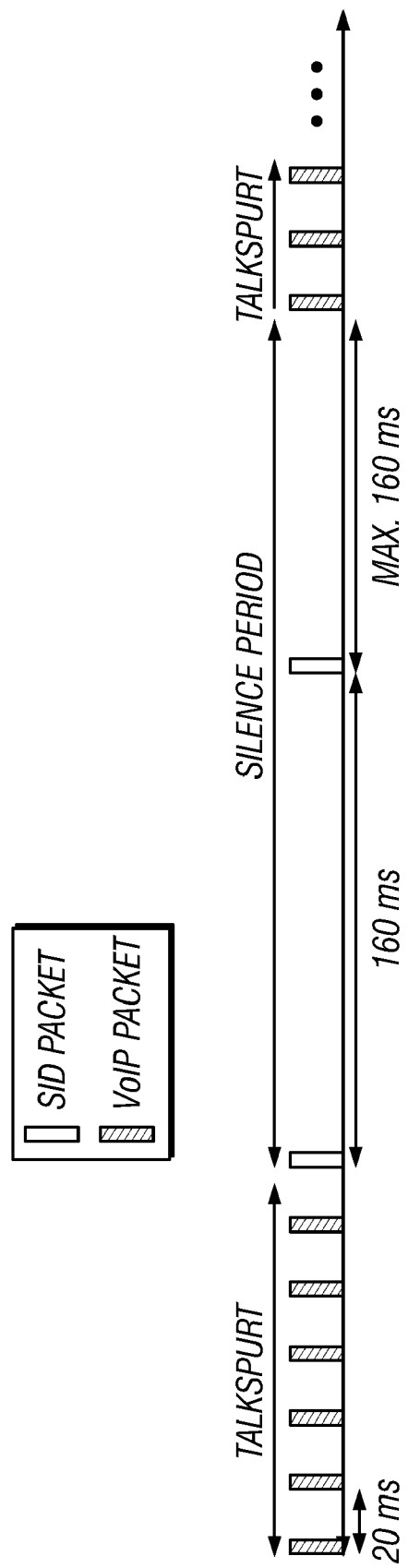
FIG. 3 is an illustration of a typical traffic pattern for two-way voice-over-internet-protocol (VoIP) communications in a wireless communications network.

The data transmitted over the wireless network is often categorized as either non-real-time (NRT) data or real-time (RT) data. Examples of NRT data include data transmitted during web browsing by a UE or text-messaging to a UE, while an example of RT data is voice communication between UEs. In 3GPP LTE, voice communication (RT data) is considered the most important application and will be carried as voice-over-internet-protocol (VoIP) transmissions. A typical VoIP session has periodic small VoIP data packets at fixed intervals and periodic silence indication (SID) packets at fixed intervals. The VoIP packets and SID packets are generated by advanced voice coding/decoding (codec) schemes, like adaptive multi-rate (AMR). AMR is an audio data compression scheme optimized for speech coding and was adopted as the standard speech codec by 3GPP. A typical VoIP traffic pattern is shown in FIG. 3. For two-way voice communication between two UEs, it is common that when one party is talking the other party will be listening. Thus, for example, DL speech bursts, sometimes called "talkspurts", will occur at the same time as UL silence periods. There are thus two distinct periods: talkspurt periods and silence periods. During a talkspurt period, a VoIP packet arrives every 20 ms, while in a silence period, a SID packet arrives every 160 ms.

The present invention relates to a system and method for reliably detecting the start and/or end of silence periods during VoIP sessions. There are aspects or features of VoIP that can be improved with knowledge of when silence periods start and end. These include, but are not limited to, discontinuous reception (DRX) by the UEs and channel quality indicator (CQI) UL transmissions by the UEs.

DRX is a mode of operation used in mobile communications to conserve the battery of the mobile device. The mobile device (UE) and the network negotiate phases in which data transfer occurs. Thus a UE capable of DRX turns on (activates reception) to receive DL packets and other signaling from the eNB, and may turn off (deactivates reception) during other times to enter a low-power state. 3GPP LTE uses a hybrid automatic repeat-request (HARQ) method, a variation of the well-known automatic repeat-request ARQ method, to transmit the VoIP packets. HARQ requires an acknowledgment signal (ACK) or negative-acknowledgement signal (NAK) to be sent by the receiver back to the transmitter to indicate that the MAC layer packet that contains the VoIP packet has been received or not received. If the transmitter receives a NAK, then the MAC packet containing the VoIP packet is retransmitted. This means that the UE will need to be activated (reception on) to receive DL VoIP packets and SID packets, and to receive DL ACK/NAK signals sent in response to UL VoIP packets, even if the DL ACK/NAK signals are sent during DL silence periods. With knowledge of when silence periods start and end, DRX can be optimized for VoIP sessions, as described in the previously-cited application Ser. No. 11/837,952, assigned to the same assignee as this application. For example, knowledge of when silence periods start and end will enable a UE operating with DRX to determine if it failed to decode a transmitted DL packet or whether there was no DL transmission.

CQI UL transmissions are regular transmissions of channel quality information back to the eNB. The eNB regularly transmits a downlink reference symbol (DLRS) that is used by the UEs for channel estimation and physical measurements. Typical measurements that take place within the UEs include signal strength or signal-to-noise ratio (SNR), average pathloss, and signal-to-interference ratio (SINR), which may be represented by a channel quality indicator (CQI). The eNB uses the CQIs from the UEs for resource scheduling. Resource scheduling means the eNB allocates modulation schemes, coding rates and subcarrier frequencies to optimize the downlink and uplink transmissions for each UE. With knowledge of when silence periods start and end, CQI UL transmissions can be optimized for VoIP sessions, as described in the previously-cited application Ser. No. 11/855, 902, now U.S. Pat. No. 8,059,632 B2, filed concurrently with this application and assigned to the same assignee as this application.

Figure 4:
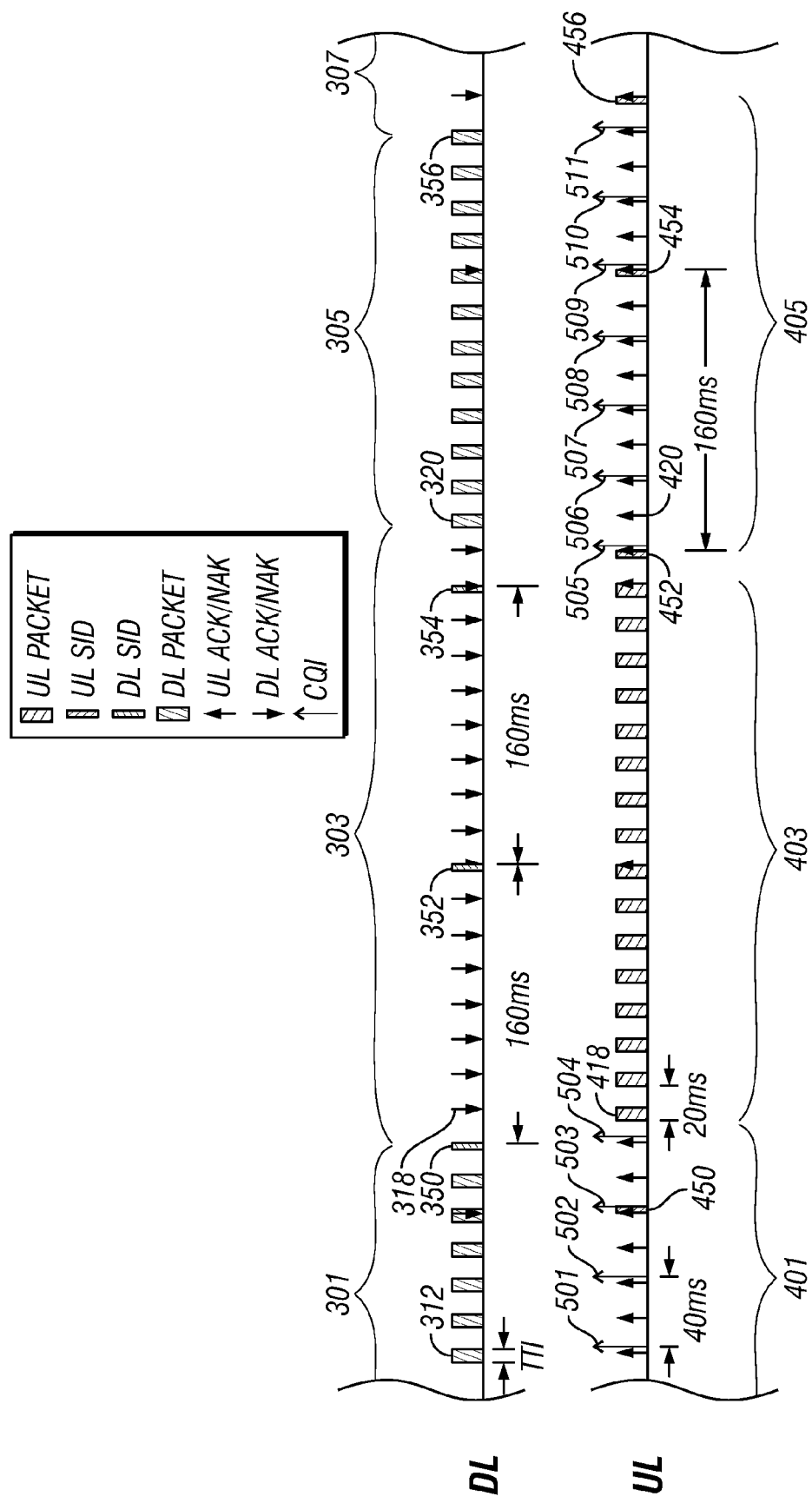
FIG. 4 is an illustration of two-way VoIP communications according to the present invention and shows downlink (DL)

FIG. 4 shows a typical traffic pattern for two-way VoIP communication that includes DL ACK/NAK signals, UL ACK/NAK signals, and CQI UL transmissions. In each direction (DL and UL), there will be talkspurt periods and silence periods. The voice codec sends out VoIP packets once per 20 ms during talkspurt and SID packets once per 160 ms during silence periods. Each VoIP packet occurs within one transmission time interval (TTI), as shown by typical DL VoIP packet 312. In the example of FIG. 4, a TTI is 1 ms, so the fixed interval between VoIP packets is 20 TTIs.

DL talkspurt periods are shown as 301 and 305, and DL silence periods are shown as 303 and 307. DL SID 350 indicates the start of DL silence period 303 and is followed by DL SID 352 160 ms later. DL SID 354 is the last SID from DL silence period 303 because it is followed by DL VoIP packet 320 which occurs less than 160 ms after DL SID 354. DL SID 356 indicates the start of DL silence period 307. Each DL VoIP packet is followed by a UL acknowledgement signal (ACK) or negative-acknowledgement signal (NAK), which indicate successful or unsuccessful receipt, respectively, of the DL VoIP packet. For example, the DL transmission of VoIP packet 320 is followed by a UL ACK 420.

A UL talkspurt period is shown as 403, and UL silence periods are shown as 401 and 405. UL SID 450 is the last SID from UL silence period 401 because it is followed by UL VoIP packet 418 which occurs less than 160 ms after UL SID 450. UL SID 452 is the first SID following UL talkspurt period 403 and indicates the beginning of UL silence period 405. UL SID 452 is followed UL SID 454 160 ms later, and UL SID 456 is the last SID in UL silence period 405. Each UL VoIP packet is followed by a DL acknowledgement signal (ACK) or negative-acknowledgement signal (NAK), which indicate successful or unsuccessful receipt, respectively, of the UL VoIP packet. For example, the UL transmission of VoIP packet 418 is followed by a DL ACK 318.

FIG. 4 shows UL CQIs transmitted during DL talkspurt periods, like CQIs 501-504 in DL talkspurt period 301 and CQIs 505-511 in DL talkspurt period 305. FIG. 4 also shows that no UL CQIs are transmitted during DL silence periods 303, 307.

Thus, as described above it is important for the eNB and UE to know the transition between a talkspurt period and a silence period (i.e., the start of a silence period). For example, in FIG. 5, both the eNb and the UE need to be able to identify DL SID 350 at the end of DL talkspurt 301 and DL SID 356 at the end of DL talkspurt 305.

In one technique, to be explained with reference to FIG. 5, both the eNB and UE can inspect the IP packet payloads to determine if the packet is a SID or voice data. As shown in FIG. 5, the generic AMR codec frame structure 600 includes a header 602 with a Frame Type field that identifies the frame as being voice data or a SID. Thus AMR frames that are SIDs can be identified from inspection of the AMR header. Similarly, AMR frames that are voice data can be identified from inspection of the AMR header. In 3GPP LTE the eNB contains the PDCP layer 215 (see FIG. 2) that converts the AMR frame into the payload portion 612 of the IP packet and adds the IP header 614. The PDCP layer 215 compresses the IP header, typically from 40 bytes to 2 or 4 bytes, to form the compressed IP header 616, but the IP payload portion 612 does not become compressed. Thus the IP payload 612 can still be identified as a SID after header compression by the PDCP. After header compression, the PDCP performs encryption to form an encrypted IP packet 618. The encrypted IP packet 618 includes the encrypted payload portion, so the IP payload can no longer be identified by the eNB as a SID. Thus in the present invention the eNB inspects each of the IP packet payloads at any time prior to encryption by the PDCP and flags those IP packets that are SIDs. The PDCP layer 215 then passes the encrypted IP packet 618 to RLC layer 216 for further processing into a protocol data unit (PDU) 619 with an RLC header 621, and then to the eNB's MAC layer 218. The MAC layer 218 converts the encrypted VoIP packet 619 into a MAC protocol data unit (PDU) that includes a MAC PDU header 622 and the PDU 624. The MAC PDU is then transmitted to the UE at arrow 626.

At the UE, the MAC PDUs are received and passed up to the UE's PDCP layer. The encrypted IP packets are decrypted at the UE's PDCP layer into IP packets with headers and payloads (like IP header 614 and IP payload 612). After decryption at the UE, the IP packet payloads can be inspected by the UE to identify those that are SIDs.

In a second technique for identifying SIDs, the eNB and UE can identify an IP packet by its size. Instead of checking the IP packet payload to determine if it is a SID, both the eNB and the UE can inspect each IP packet for size. It is known that a SID packet is smaller than the smallest possible VoIP data packet. For example, a SID packet may be set at 15 bytes in length, which is smaller than the smallest possible VoIP data packet. In this technique the eNB checks each IP packet and flags those less than a predetermined size as SIDs. Similarly, the UE checks each IP packet it receives to identify those less than a predetermined size as SIDs. The checking for packet size can be done at different stages of the process illustrated in FIG. 7. This is because if the IP packet size is small, the IP header 614 and compressed header 616 will also be small, the encrypted IP packet 618 will also be small, and the MAC PDU 624 will also be small. Thus the eNB and the UE can check the packet size at any one of these process steps.

In both of the above-described SID detection techniques, both the eNB and the UE perform SID detection by inspecting the IP packets. However, in a modification of both of the techniques, only the eNB flags the SIDs. Referring again to FIG. 5, the PDCP layer 610 passes the encrypted IP packet 618 to the eNB's MAC layer 620. The MAC layer 620 converts the encrypted IP packet 618 into a MAC protocol data unit (PDU) that includes a MAC PDU header 622 and the PDU 624. However, instead of transmitting the MAC PDU to the UE at arrow 626, if a SID was previously flagged, then the MAC layer 620 modifies the MAC header 622 to MAC header 623 with a "control bit" (cbit) 628. This can be done by modifying one of the existing header bits (for example the most significant bit), for example changing that bit from "0" to "1". Alternatively, the cbit 628 can be an extra bit added to the MAC header 622. The MAC PDU with the MAC header 623 containing the cbit 628 is then transmitted to the UE at arrow 629.

At the UE, the MAC PDUs are received at the UE's MAC layer and those with a cbit are flagged as SID packets. With this modification to the technique, only the eNB needs to inspect the IP packet payloads to either identify the packet as a SID packet or to identify it by packet size. The UE only needs to detect the cbits in the headers of the MAC PDUs received from the eNB. This reduces the complexity of the UE.

In the above described techniques and modified techniques for identifying SIDS, only the first DL SID occurring after a DL VoIP packet needs to be identified, because it is this SID that indicates the start of a silence period. For example, referring again to FIG. 4, it is DL SID 350 that needs to be flagged by the eNB because that indicates the start of DL silence period 303. Thus it is not necessary for SID 352 to be flagged. Because the AMR Frame Type also identifies frames that are voice frames, when the eNB inspects the IP packet payloads, it checks for both VoIP data packets and SID packets and only needs to flag the first SID packet that occurs after a VoIP data packet. If the technique is the one where the UE also inspects the IP packet payloads, then the UE only needs to flag the first SID packet that occurs after a VoIP data packet.

It may also be important for the eNB and the UE to know the transition between a silence period and a talkspurt period (i.e., the end of a silence period). This situation is shown in FIG. 4 by DL silence period 303 (with last DL SID 354) followed by DL talkspurt period 305 (with first DL VoIP data packet 320). The techniques for doing this are directly analogous to those described above for detecting the start of a DL silence period. The only difference is that the eNB only needs to flag the first VoIP data packet that occurs after a SID packet, e.g., VoIP data packet 320 after SID packet 354. If the technique is the one where the UE also inspects the IP packet payloads, then the UE only needs to flag the first VoIP data packet that occurs after a SID packet. If the technique is the one where the eNB modifies the MAC header 623 with a cbit 628 (FIG. 7), then a first cbit will identify the first SID packet after a VoIP packet (start of a silence period) and a second cbit will identify the first VoIP packet after a SID packet (end of a silence period).

As mentioned above, the base stations (eNBs) and mobile devices (UEs) have dedicated processors and/or microprocessors and associated memory. Thus the above-described method may be implemented in software modules or components of executable code stored in memory in the base stations and mobile devices. The dedicated processors and/or microprocessors perform logical and arithmetic operations based on the program instructions stored in memory to perform the method of this invention.

While the present invention has been described above for VoIP, which has a traffic pattern characterized by periodic packets, it is fully applicable to applications other than VoIP where the traffic patterns are characterized by small periodic packets. Also, the present invention is applicable to other wireless communications networks, like those based on the IEEE 802.16 and IEEE 802.11 standards.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A mobile device for connection in a cellular network, the network having an eNodeB capable of voice-over-internet-protocol (VoIP) transmission comprising VoIP packets and silence indication (SID) packets, the VoIP packets representing a talkspurt period and the SID packets representing a silence period, wherein the VoIP packets and SID packets are received by the mobile device as medium access control (MAC) protocol data units (PDUs) having MAC headers, the mobile device being capable of VoIP transmission and of receiving VoIP transmission, the mobile device comprising:
   a processor;
   memory accessible by the processor; and
   computer program instructions in the memory and readable by the processor for performing the processor-implemented steps of:
   when the eNodeB is transmitting non-real-time (NRT) data to the mobile device, transmitting channel quality indicators (CQIs) to the eNodeB;
   when the eNodeB is transmitting VoIP to the mobile device, the VoIP packets and SID packets having been converted by the eNodeB prior to transmission into MAC PDUs having MAC headers and the MAC header of a PDU having been modified by the eNodeB prior to transmission with a control bit only if the IP payload associated with said PDU is a SID packet that follows a VoIP packet, detecting at the mobile device the start of a silence period by detecting the control bit in the MAC headers of the PDUs associated with the SID packets; and
   during an identified silence period, not transmitting CQIs from the mobile device to the eNodeB.

2. The mobile device of claim 1 wherein the computer program instructions further comprise instructions for performing the processor-implemented step of detecting at the mobile device the end of a silence period by detecting a control bit in the MAC headers of the PDUs associated with the VoIP packets.

3. The mobile device of claim 1 wherein the mobile device is capable of discontinuous reception (DRX), and wherein the computer program instructions further comprise instructions for activating reception by the mobile device for receipt of VoIP packets and SID packets from the eNodeB.

4. A method for voice-over-internet-protocol (VoIP) transmission in a cellular network that includes an eNodeB and a user equipment (UE) capable of VoIP transmission and of receiving VoIP transmission, wherein the VoIP transmission is formatted as internet protocol (IP) packets comprising an IP header and an IP payload and comprises VoIP packets representing talkspurt periods and silence indication (SID) packets representing silence periods, the method comprising:
   converting the IP packets at the eNodeB into medium access control (MAC) protocol data units (PDUs) having MAC headers;

modifying, at the eNodeB, the MAC header of a PDU with a control bit prior to transmission to the UE only if the IP payload associated with said PDU is a SID packet that follows a VoIP packet;

when the eNodeB is transmitting non-real-time (NRT) data to the UE, transmitting channel quality indicators (CQIs) to the eNodeB;

transmitting PDUs from the eNodeB to the UE;

detecting at the UE the start of a silence period by detecting the control bit in the modified MAC header of said PDU associated with the SID packets; and during an identified silence period, not transmitting CQIs from the UE to the eNodeB.

* * * * *